(12) United States Patent
Brasas et al.

(10) Patent No.: US 9,450,458 B2
(45) Date of Patent: Sep. 20, 2016

(54) ELECTRIC MACHINE HAVING A SEGMENTED STATOR AND TWO-LAYER WINDING

(71) Applicant: SIEMENS AKTIENGESELLSCHAFT, München (DE)

(72) Inventors: Frank Brasas, Kösslarn (DE); Robin Brenner, Passau (DE); Norbert Schönbauer, Bad Füssing (DE); Claus Teringl, Pocking (DE)

(73) Assignee: SIEMENS AKTIENGESELLSCHAFT, Ingolstadt (DE)

( * ) Notice: Subject to any disclaimer, the term of this patent is extended or adjusted under 35 U.S.C. 154(b) by 0 days.

(21) Appl. No.: 14/767,950

(22) PCT Filed: Feb. 15, 2013

(86) PCT No.: PCT/EP2013/053094
§ 371 (c)(1),
(2) Date: Aug. 14, 2015

(87) PCT Pub. No.: WO2014/124687
PCT Pub. Date: Aug. 21, 2014

(65) Prior Publication Data
US 2015/0380991 A1 Dec. 31, 2015

(51) Int. Cl.
*H02K 1/06* (2006.01)
*H02K 1/16* (2006.01)
(Continued)

(52) U.S. Cl.
CPC ............... *H02K 1/165* (2013.01); *H02K 1/16* (2013.01); *H02K 3/12* (2013.01); *H02K 3/28* (2013.01); *H02K 7/1807* (2013.01); *H02K 7/183* (2013.01); *H02K 2213/12* (2013.01)

(58) Field of Classification Search
CPC ........ H02K 1/16; H02K 3/28; H02K 7/1807; H02K 7/183
USPC ............................ 310/216.001–216.137, 208
See application file for complete search history.

(56) References Cited

U.S. PATENT DOCUMENTS

| 4,080,724 A | * | 3/1978 | Gillette | H02K 1/06 29/596 |
| 4,990,809 A | * | 2/1991 | Artus | H02K 37/04 310/192 |

(Continued)

FOREIGN PATENT DOCUMENTS

EP 2 166 644 3/2010

Primary Examiner — Hanh Nguyen
(74) Attorney, Agent, or Firm — Henry M. Feiereisen LLC.

(57) ABSTRACT

Electric machine has a rotor movable relative to a stator divided into stator segments, each having first and second transition regions and a central region between the transition regions. The stator segment has a yoke extending over the central region and the first transition region. Central groove webs in the central regions and first transition webs in the first transition regions extend from the yoke towards the rotor. The first transition webs end below the central groove webs. The stator segment has in the second transition region a transverse web from which second transition webs extend towards the rotor. The second transition webs end level with the central groove webs. A spacing of the first transition webs from the rotor at least corresponds to a spacing of a lower edge of the transverse web. Transition regions of adjoining stator segments overlap one another and are disposed one above the other.

10 Claims, 6 Drawing Sheets

(51) Int. Cl.
*H02K 3/12* (2006.01)
*H02K 3/28* (2006.01)
*H02K 7/18* (2006.01)

(56) References Cited

U.S. PATENT DOCUMENTS

| | | | |
|---|---|---|---|
| 7,772,738 | B2 | 8/2010 | Huppunen et al. |
| 8,648,505 | B2 | 2/2014 | Memminger et al. |
| 8,686,607 | B2 | 4/2014 | Memminger et al. |
| 2006/0071114 | A1 | 4/2006 | Banba et al. |
| 2010/0066196 | A1 | 3/2010 | Stiesdal |
| 2010/0066199 | A1 | 3/2010 | Shinagawa et al. |
| 2011/0254391 | A1 | 10/2011 | Memminger et al. |
| 2011/0278969 | A1 | 11/2011 | Memminger et al. |
| 2013/0002086 | A1* | 1/2013 | Kaiser ............. H02K 1/16 310/216.009 |
| 2013/0154429 | A1 | 6/2013 | Schönbauer et al. |
| 2013/0187514 | A1* | 7/2013 | Iwata ............. H02K 1/16 310/216.009 |

* cited by examiner

ELECTRIC MACHINE HAVING A SEGMENTED STATOR AND TWO-LAYER WINDING

CROSS-REFERENCES TO RELATED APPLICATIONS

This application is the U.S. National Stage of International Application No. PCT/EP2013/053094, filed Feb. 15, 2013, which designated the United States and has been published as International Publication No. WO 2014/124687.

BACKGROUND OF THE INVENTION

The present invention relates to an electric machine
wherein the electric machine has a stator and a rotor,
wherein the rotor is movable relative to the stator in a direction of movement,
wherein when viewed in the direction of movement of the rotor, the stator is divided into stator segments adjoining one another,
wherein the stator segments each have a central region, a first transition region and a second transition region,
wherein when viewed in the direction of movement of the rotor, the central regions are arranged between the first transition region and the second transition region of the respective stator segment,
wherein the stator segments each have a stator yoke on the side facing away from the rotor which extends over the respective central region and the respective first transition region,
wherein starting from the stator yokes, central groove webs in the respective central region and first transition webs in the respective first transition region extend toward the rotor,
wherein on their side facing away from the rotor the stator segments each have a transverse web in the respective second transition region,
wherein starting from the respective transverse web, respective second transition webs extend toward the rotor in the respective second transition region,
wherein when viewed in the direction toward the rotor, the second transition webs end at the same height as the central groove webs,
wherein when viewed in the direction toward the rotor, lower edges of the stator yokes have a yoke spacing from the rotor.

Electric machines have a stator which for its part has a stator yoke, starting from which webs extend toward the rotor. A stator groove is formed in each case between immediately adjacent webs. The stator winding system of the electric machine is arranged in the stator grooves.

In the simplest case, one winding half of a single winding of the stator winding system is arranged in each stator groove. The other half of the respective winding runs in another stator groove, in which case no winding half of another winding of the stator winding system is arranged in said groove. Such a stator winding system is normally referred to in the prior art as a single-layer winding.

Alternatively, it is possible that the winding halves of two windings of the stator winding system are arranged in each stator groove. The other winding half of the one winding and the other winding half of the other winding are arranged in two other stator grooves, in which case the first-mentioned stator groove is arranged between the two other stator grooves. Such a stator winding system is normally referred to in the prior art as a two-layer winding. Compared with a single-layer winding, a two-layer winding exhibits electromagnetic advantages and is therefore to be preferred as a rule.

Provided that the stator is a uniform part (viewed in the direction of movement of the rotor), it is easily possible to wind the stator with a two-layer winding. In the case of larger electric machines, both manufacturing advantages and also transportation advantages and also storage-related advantages are however offered if the stator consists of a plurality of segments (stator segments). In the case of such an embodiment of the stator a two-layer winding cannot readily be implemented.

It is known in the prior art to furnish the stator segments with a single-layer winding, for example a single-layer winding as is known from EP 2 166 644 A1. Although this solution can be readily implemented, the electromagnetic disadvantages which are associated with a single-layer winding are however accepted.

An electric machine of the type mentioned in the introduction is known for example from U.S. Pat. No. 7,772,738 B2. In the case of the electric machine from U.S. Pat. No. 7,772,738 B2 the transverse web constitutes a continuation of the stator yoke. The central groove webs, the first transition webs and the second transition webs are embodied the same. The stator segments adjoin one another edge to edge.

Although it is known from U.S. Pat. No. 7,772,738 B2 to arrange a two-layer winding in the grooves formed by the webs of the stator segments, in other words to furnish the stator segments with a two-layer winding, the two-layer winding from U.S. Pat. No. 7,772,738 B2 is however incomplete. In particular, while one of two winding halves of a first winding and one of two winding halves of a second winding are arranged in each case between two central groove webs, on the other hand only the second winding half of a first winding or the second winding half of a second winding is arranged in each case in the transition regions. The two-layer winding is therefore incomplete in the transition regions. An attempt is made in U.S. Pat. No. 7,772,738 B2 to compensate for the resulting disadvantageous electromagnetic effect in that the stator yoke and the transverse web exhibit a greater strength in the regions adjoining the adjacent stator segments than between said regions. The compensation is however only incomplete.

It is theoretically conceivable to complete the incomplete two-layer winding from U.S. Pat. No. 7,772,738 B2 at a later time. In this case, while the electromagnetic disadvantages would be resolved it is however difficult or almost impossible to ensure a high quality level of the subsequently produced windings. Rather, it must be expected that the operational reliability (dependability) of the electric machine is significantly reduced.

SUMMARY OF THE INVENTION

The object of the present invention consists in creating an electric machine which can be furnished with a high-quality two-layer winding even though the stator is divided into stator segments which adjoin one another when viewed in the direction of movement of the rotor.

The object is achieved according to the invention by an electric machine including a stator and a rotor,
wherein the rotor is movable relative to the stator in a direction of movement,
wherein when viewed in the direction of movement of the rotor, the stator is divided into stator segments adjoining one another, wherein the stator segments each have a central region, a first transition region and a second transition region, wherein when viewed in the direction of movement of the rotor, the central regions are arranged between the first transition region and the second transition region of the respective stator segment, wherein the stator segments each have a stator yoke on the side facing away from the rotor which extends over the respective central region and the respective first transition region, wherein starting from the stator yokes, central groove webs in the respective central region and first transition webs in the respective first transition region extend toward the rotor, wherein when viewed in the direction toward the rotor, the first transition webs end beneath the central groove webs, wherein on their side facing away from the rotor the stator segments each have a transverse web in the respective second transition region, wherein starting from the respective transverse web, respective second transition webs extend toward the rotor in the respective second transition region, wherein when viewed in the direction toward the rotor, the first transition webs end beneath the central groove webs, wherein when viewed in the direction toward the rotor, a spacing of the first transition webs from the rotor is at least as great as a spacing of a lower edge of the transverse webs facing away from the rotor and wherein when viewed in the direction of movement of the rotor, the first transition region and the second transition region of stator segments immediately adjoining one another overlap one another and are arranged one above the other when viewed from the stator toward the rotor.

Advantageous embodiments of the electric machine according to the invention are set down in the dependent claims.

As a result of this embodiment of the electric machine—in particular of the stator segments—the stator segments can be furnished completely with the two-layer winding in advance, in other words before the stator segments are assembled to form the stator.

The two-layer winding can therefore be incorporated into the stator segments by the manufacturer. A subsequent incorporation of windings in the transition regions, which would need to take place only after the assembly of the stator segments at the operating location of the electric machine, is not necessary.

Different embodiments are possible for the construction of the stator segments. For example, it is possible that when viewed in the direction of movement of the rotor, the stator segments are embodied in one piece. Alternatively, it is possible that when viewed in the direction of movement of the rotor, the stator segments each have a first stator segment part and a second stator segment part, that the respective first stator segment part comprises the central region and the first transition region of the respective stator segment, that the respective second stator segment part comprises the second transition region of the respective stator segment and that the respective first stator segment part and the respective second stator segment part are connected to one another.

In the latter case the respective first stator segment part and the respective second stator segment part can be connected to one another for example by means of a tongue-and-groove connection. Alternatively, for example, a threaded connection is possible.

The two-layer winding can in particular be implemented in that one of two winding halves of a first winding and one of two winding halves of a second winding are arranged in each case between two central groove webs, in that the other winding half of the first winding is arranged between two central groove webs, between the central groove web adjoining the first transition region of the respective stator segment and the first transition web adjoining the central region of the respective stator segment or between two first transition webs of the respective stator segment, in that the other winding half of the second winding is arranged between two central groove webs, between the central groove web adjoining the second transition region of the respective stator segment and the second transition web adjoining the central region of the respective stator segment or between two second transition webs of the respective stator segment, in that exclusively the other winding half of a first winding but no winding half of a second winding is arranged in each case between two first transition webs and in that exclusively the other winding half of a second winding but no winding half of a first winding is arranged in each case between two second transition webs.

The first windings are preferably constructed the same as one another. Furthermore, the second windings are preferably constructed the same as one another. An embodiment in which all the windings are constructed the same is particularly advantageous.

It is possible that the stator segments are components of a linear electric machine. As a general rule (rotary electric machine) the stator segments are however curved in circular fashion about an axis of rotation, in which case the direction of movement of the rotor runs tangentially with respect to the axis of rotation and the direction from the stator to the rotor runs radially with respect to the axis of rotation.

The electric machine can in principle be used for any purpose. It is preferably used as a generator in a wind turbine.

BRIEF DESCRIPTION OF THE DRAWING

The properties, features and advantages of the present invention as described above and the manner in which they are achieved will become clearer and more readily comprehensible in conjunction with the description which follows of the exemplary embodiments set out in more detail in conjunction with the schematic drawings, in which.

DETAILED DESCRIPTION OF PREFERRED EMBODIMENTS

Figure 1:
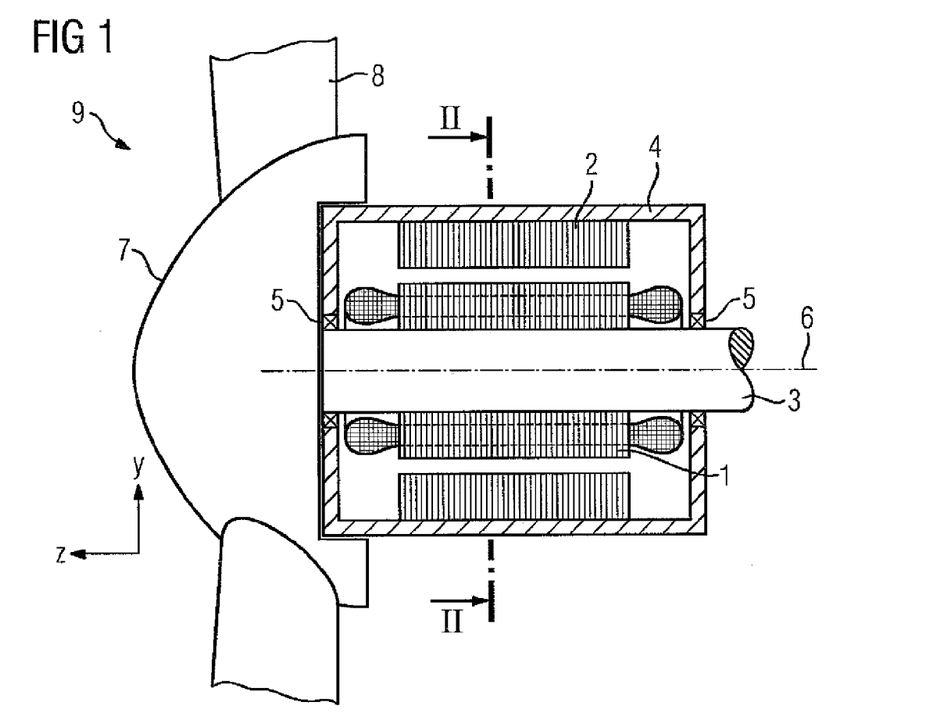
FIG. 1 shows a longitudinal section of an electric machine.
Figure 2:
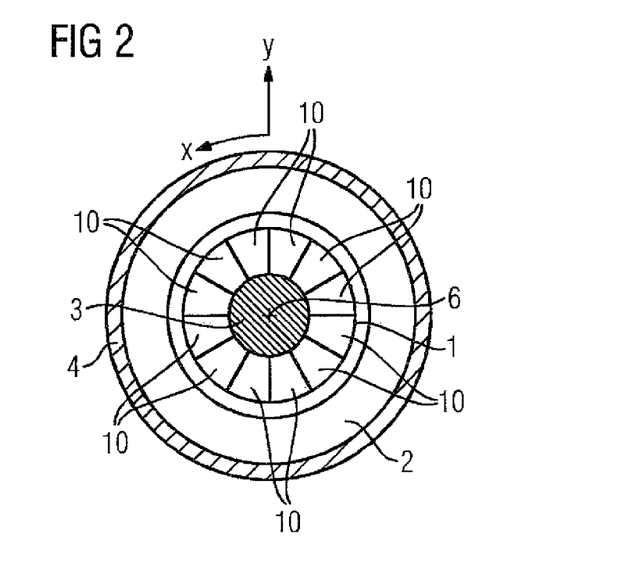
FIG. 2 shows a section of the electric machine from FIG. 1 along a line II-II in FIG. 1.

According to FIGS. 1 and 2, an electric machine has a stator 1 and a rotor 2. The stator 1 is affixed on a stator carrier 3. The rotor 2 is affixed on a rotor carrier 4. The rotor carrier 4 and with it the rotor 2 is movable relative to the stator 1 in a direction of movement x. According to FIGS. 1 and 2, the rotor 2 is mounted in bearings 5 and is thereby rotatable about an axis of rotation 6. The electric machine is therefore constructed as a rotary electric machine. As a result, the direction of movement x of the rotor 2 runs tangentially with respect to the axis of rotation 6. A direction y from the stator 1 toward the rotor 2 runs radially with respect to the axis of rotation 6. Furthermore, where required, the reference character z is used in the following for an extension direction of the axis of rotation 6.

According to FIGS. 1 and 2—in relation to the axis of rotation 6—the stator 1 is arranged radially internally and the rotor 2 is arranged radially externally. The electric machine from FIGS. 1 and 2 is thus embodied as an external rotor machine. The present invention will be described in detail in the following in the context of an external rotor machine. The present invention is however likewise applicable in the case of an internal rotor machine.

According to FIGS. 1 and 2, a hub 7 is affixed on the rotor carrier 4. The hub 7 carries rotor blades 8 of a wind generator 9. The electric machine is therefore used as a generator of a wind turbine. In principle however the electric machine could also be used for other purposes.

According to FIG. 2, when viewed in the direction of movement x of the rotor 2, the stator 1 is divided into stator segments 10 adjoining one another. The stator segments 10 are, because the electric machine is embodied as a rotary electric machine, curved in circular fashion about the axis of rotation 6. If the present invention were to be used in the case of a linear electric machine, the stator segments 10 would be straight.

The stator segments 10 are preferably constructed the same as one another. The construction of an individual stator segment 10—representing all the stator segments 10—will therefore be described in detail in the following with reference to FIGS. 3 and 4. The corresponding statements are however applicable to all the stator segments 10.

Figure 3:
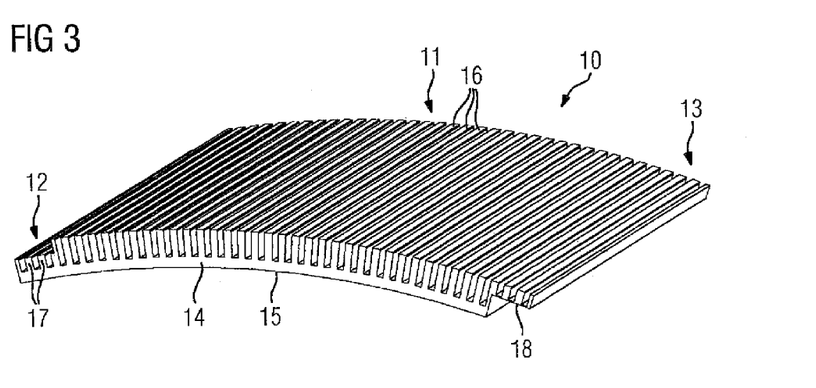
FIG. 3 shows a perspective view of a stator segment.
Figure 4:
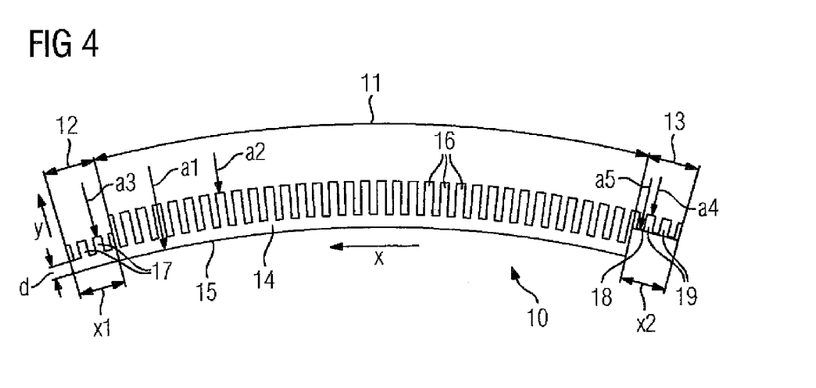
FIG. 4 shows a side view of the stator segment from FIG. 3.

According to FIGS. 3 and 4, the stator segment 10 has a central region 11, a first transition region 12 and a second transition region 13. When viewed in the direction of movement x of the rotor 2, the central region 11 is arranged between the first transition region 12 and the second transition region 13.

On its the side facing away from the rotor 2 the stator segment 10 has a stator yoke 14. The stator yoke 14 extends over the central region 11 and the first transition region 12. It normally has a uniform thickness d. When viewed in the direction toward the rotor 2, a lower edge 15 of the stator yoke 14 therefore has a spacing a1 from the rotor 2 which, when viewed in the direction of movement x of the rotor, is constant as a function of the position. The spacing a1 is referred to in the following as yoke spacing.

Starting from the stator yoke 14, central groove webs 16 in the central region 11 extend toward the rotor 2. Furthermore, first transition webs 17 in the first transition region 12 extend toward the rotor 2. When viewed in the direction toward the rotor 2, the central groove webs 16 have a spacing a2 from the rotor 2. The spacing a2 is uniformly the same for the central groove webs 16. When viewed in the direction toward the rotor 2, the first transition webs 17 have a spacing a3 from the rotor 2. The spacing a3 is uniformly the same for the first transition webs 17. It is however greater than the spacing a2 of the central groove webs 16. When viewed in the direction toward the rotor 2, the first transition webs 17 thus end beneath the central groove webs 16.

On its side facing away from the rotor 2 the stator segment 10 furthermore has a transverse web 18 in the second transition region 13. Starting from the transverse web 18, second transition webs 19 extend toward the rotor 2 in the second transition region 13. When viewed in the direction toward the rotor 2, the second transition webs 19 have a spacing a4 from the rotor 2. The spacing a4 of the second transition webs 19 is the same as the spacing a2 of the central groove webs 16. When viewed in the direction toward the rotor 2, the second transition webs 19 thus end at the same height as the central groove webs 16.

The transverse web 18 must conduct a magnetic flux only to a limited extent. The transverse web 18 is also subject to mechanical stress only to a limited extent. A thickness of the transverse web 18 can therefore be relatively small.

Figure 5:
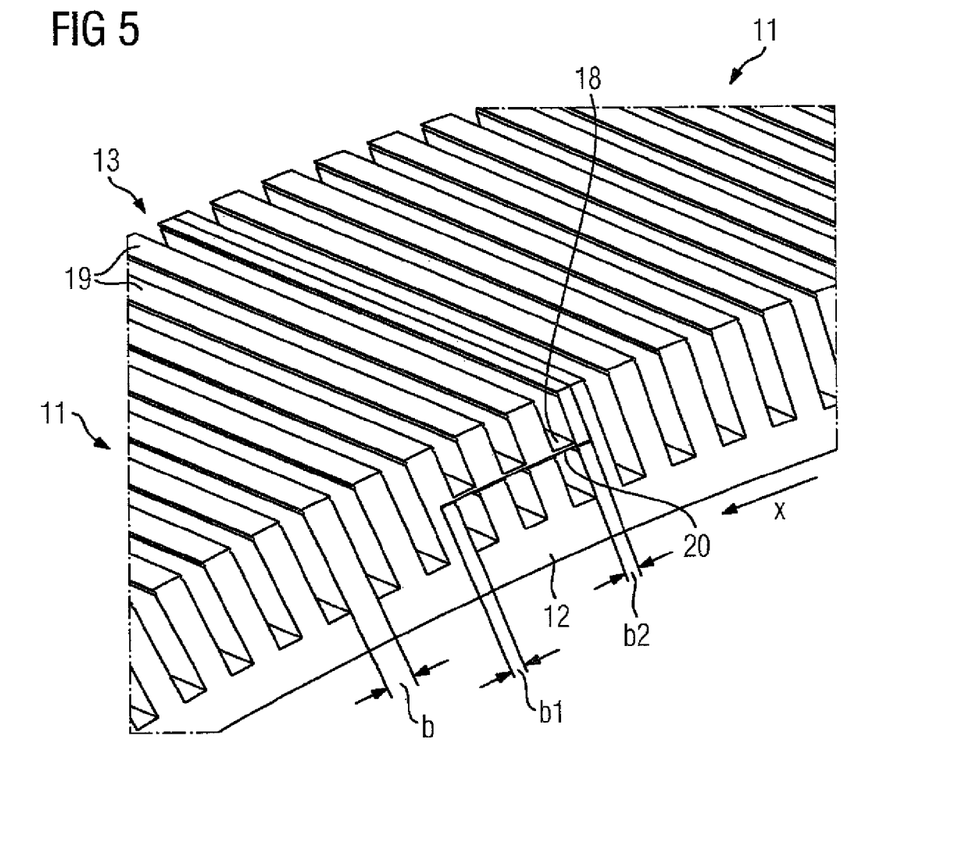
FIG. 5 shows parts of two stator segments adjoining one another.

According to FIG. 5, when viewed in the direction toward the rotor 2, the lower edge 20 of the transverse web 18 facing away from the rotor 2 has a spacing a5 from the rotor 2. The spacing a5 is at most as great as the spacing a3 of the first transition webs 17 from the rotor 2. In other words: When viewed in the direction toward the rotor 2, the spacing a3 of the first transition webs 17 from the rotor 2 is at least as great (preferably exactly as great) as the spacing a5 of the lower edge 20 of the transverse web 18 from the rotor 2.

When viewed in the direction of movement x of the rotor 2, the first transition region 12 and the second transition region 13 furthermore have equal longitudinal extensions x1, x2. In the assembled state, in other words when the stator segments 10 adjoin one another, according to FIG. 5 when viewed in the direction of movement x of the rotor 2, the first transition region 12 and the second transition region 13 of stator segments 10 immediately adjoining one another therefore overlap one another. Furthermore, according to FIG. 5 when viewed from the stator 1 toward the rotor 2, the first transition region 12 and the second transition region 13 of stator segments 10 immediately adjoining one another are arranged one above the other. It can also be seen from FIG. 5 that the outermost transition webs 17, 19 of the first and second transition regions 12, 13 have web widths b1, b2 which are approximately half a web width b of the central groove webs 16.

Figure 6:
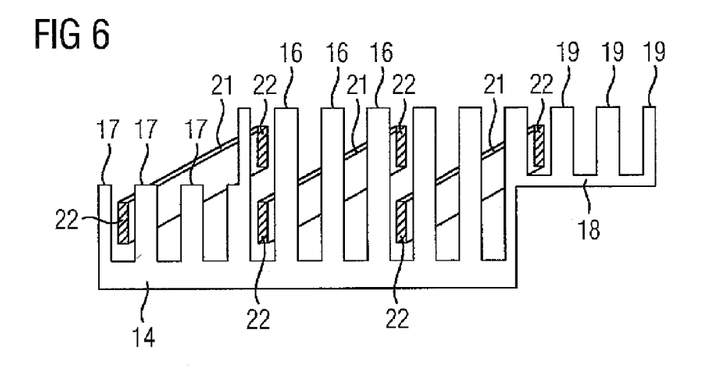
FIG. 6 shows an unrolled view from the side of a stator segment having windings of one phase.

FIG. 6 schematically illustrates the arrangement of windings 21 between the central groove webs 16, the first transition webs 17 and the second transition webs 19 for an individual phase of a plurality of phases. According to FIG. 6, two winding halves 22 of two different windings 21 are arranged in each case between two central groove webs 16. With regard to the one winding 21, the other winding half 22 of the corresponding winding 21 is arranged either between two central groove webs 16, between the central groove web 16 adjoining the first transition region 12 and the first transition web 17 adjoining the central region 11 or between two first transition webs 17. In any case however, the other winding half 22 of the corresponding winding 21 is arranged "to the left". With regard to the other winding 21, the other winding half 22 of the corresponding winding 21 is arranged either between two central groove webs 16, between the central groove web 16 adjoining the second transition region 13 and the second transition web 19 adjoining the central region 11 or between two second transition webs 19. In any case however, the other winding half 22 of the corresponding winding 21 is arranged "to the right". On the other hand, exclusively a single winding half 22 is arranged between two first transition webs 17 in each case and two second transition webs 19 in each case. While one winding half 22 of a winding 21 is therefore arranged in each case between two first transition webs 17, in which case the other winding half 22 of said winding 21 is arranged between two central groove webs 16, on the other hand no further winding half is arranged in each case between two first transition webs 17. In similar fashion, while one winding half 22 of a winding 21 is namely arranged between two second transition webs 19, in which case the other winding half 22 of said winding 21 is arranged between two central groove webs 16, on the other hand no further winding half is arranged in each case between two second transition webs 19.

In relation to an individual pair of central groove webs 16, the two winding halves 22 arranged between said two central groove webs 16 are arranged one above the other. In each case, one of said two winding halves 22 is therefore arranged closer to the stator yoke 14 ("below") and closer to the rotor 2 ("above"). That winding 21 is firstly considered in the following where the winding half 22 is arranged below in the pair of central groove webs 16 under consideration. It is possible that the other winding half 22 of said winding 21 is likewise arranged below, in other words is either the lower winding half 22 there between two other central groove webs 16 or is arranged between two first transition webs 17. In this case the windings 21 arranged "below" are preferably constructed the same as one another.

That winding 21 is now considered where the winding half 22 is arranged above in the pair of central groove webs 16 under consideration. In similar fashion, it is possible that the other winding half 22 of said winding 21 is likewise arranged above, in other words is either the upper winding half 22 there between two other central groove webs 16 or is arranged between two second transition webs 19. Likewise in this case the windings 21 arranged "above" are preferably constructed the same as one another.

Figure 7:
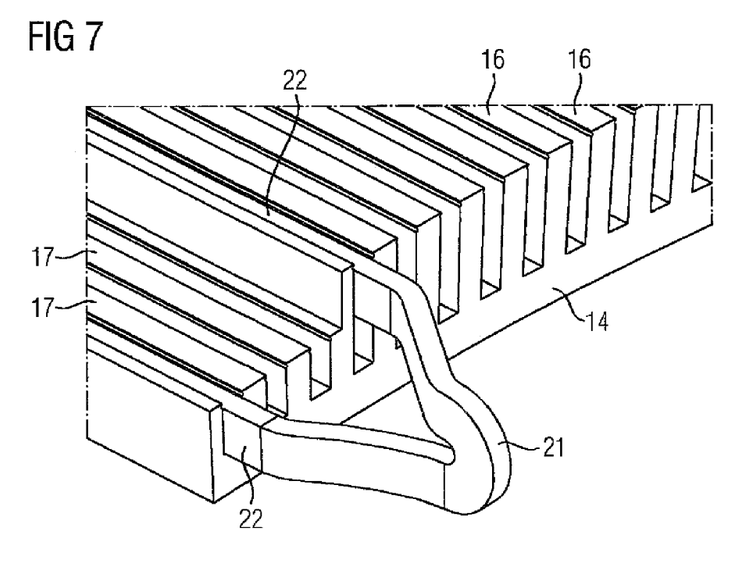
FIG. 7 shows a part of a central region and of a first transition region of a stator segment having a winding.
Figure 8:
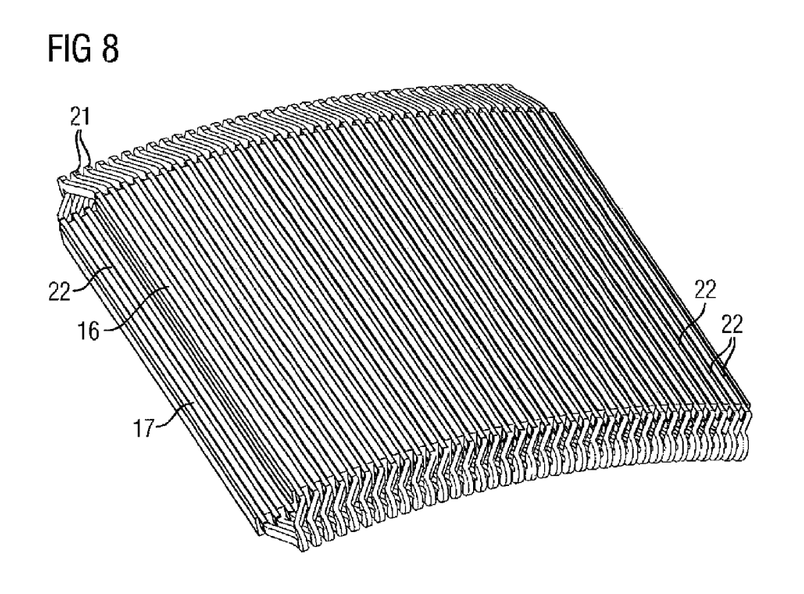
FIG. 8 shows a perspective view of a stator segment having windings.
Figure 9:
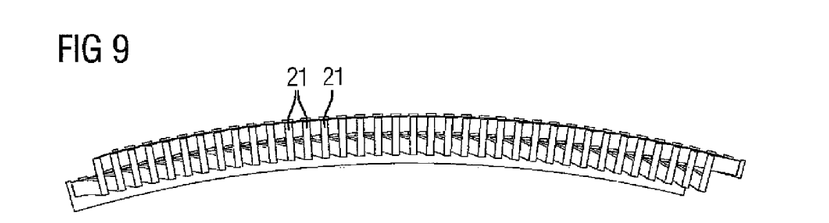
FIG. 9 shows a side view of a stator segment having windings.

The two winding halves 22 of a winding 21 are however preferably arranged one above and one below in each case. This is illustrated in FIG. 6 and—for an individual winding 21—in FIG. 7. In this case all the windings 21 can be constructed uniformly. FIG. 8 and FIG. 9 show a corresponding stator segment 10 fully furnished with windings 21.

Required region widths of the central region 11, the first transition region 12 and the second transition region 13 result from the arrangement of two winding halves 22 in each case between each two central groove webs 16 and one winding half 22 in each case between each two first and second transition webs 17, 19. In particular, the first transition webs 17 of the first transition region 12 and the second transition webs 19 of the second transition region 13 must in each case form m+1 grooves, where m is the number of grooves which are skipped by a particular winding 21. The central groove webs 16 must form an integer multiple of m+1 grooves.

With regard to the embodiment of the stator segments 10 described above in conjunction with FIGS. 3 to 9, when viewed in the direction of movement x of the rotor 2, the stator segments 10 are embodied in one piece (sheet metal blank). This is not mandatory however. A further embodiment of the stator segments 10 will be described in the following in conjunction with FIGS. 10 and 11 wherein, when viewed in the direction of movement x of the rotor 2, the stator segments 10 in each case have a first stator segment part 23 and a second stator segment part 24. The division of the stator segments 10 into the first stator segment part 23 and the second stator segment part 24 constitutes the essential difference. The statements made above in conjunction with FIGS. 3 to 9 are therefore—with the exception of the one-piece design—also applicable in similar fashion to the embodiment according to FIGS. 10 and 11.

Figure 10:
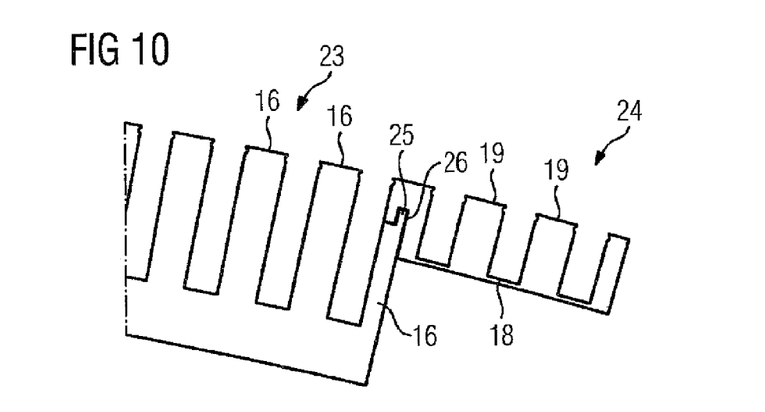
FIG. 10 shows a part of a central region and a second transition region of a stator segment and FIG. 11 shows parts of two stator segments adjoining one another.
Figure 11:
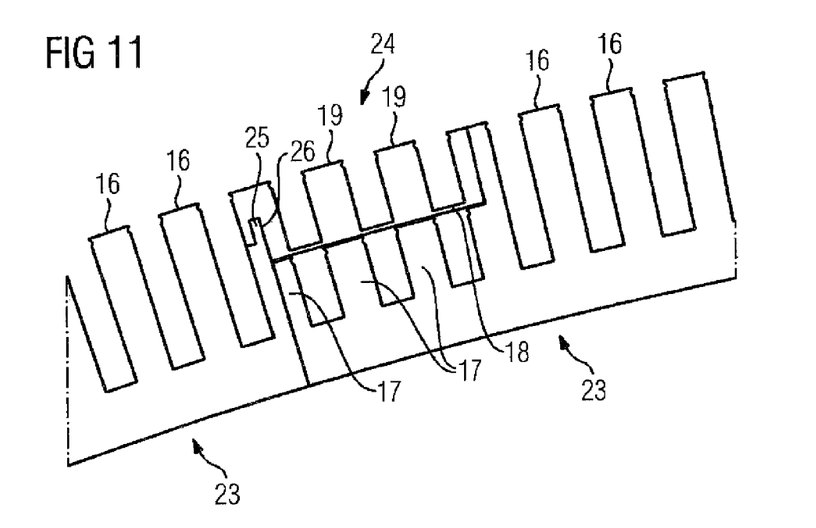

According to FIGS. 10 and 11, the second stator segment part 24 comprises the second transition region 13. The first stator segment part 23 comprises the remaining part of the stator segment 10, in other words the central region 11 and the first transition region 12. The first stator segment part 23 and the respective second stator segment part 24 are—naturally—connected to one another. For example, the central groove web 16 adjoining the second transition region 13 can have a projection 25 at the end thereof facing the rotor 2. The projection 25 interacts in this case with a corresponding recess 26 which is incorporated into the second transition web 19 adjoining the central region 11. The projection 25 and the recess 26 form a tongue-and-groove connection by means of which the first stator segment part 23 and the second stator segment part 24 are connected to one another.

Compared with other electric machines in which the stator 1 is constructed from stator segments 10, the electric machine according to the invention exhibits considerable advantages. In particular, it is possible in a relatively simple manner to implement an electric machine having a complete two-layer winding without negatively influencing the dependability and operational reliability of the electric machine. As a result of the same embodiment of the windings 21 shorter projections can be implemented, which in turn means that electrical losses can be minimized. Furthermore, the windings 21 exhibit (at least essentially) the same electrical resistances. Furthermore, so-called circulating currents can be significantly reduced.

Although the invention has been illustrated and described in detail by means of the preferred exemplary embodiment, the invention is not restricted by the disclosed examples and other variations can be derived therefrom by the person skilled in the art without departing from the scope of protection of the invention.

The invention claimed is:

1. An electric machine, comprising:
a stator; and
a rotor movable relative to the stator in a direction of movement,
said stator being divided into adjoining stator segments, when viewed in the direction of movement of the rotor, each of the stator segments having a first transition region, a second transition region, a central region arranged between the first and second transition regions, and a stator yoke disposed on a side facing away from the rotor and extending over the central region and the first transition region, said central region having central groove webs extending from the stator yokes toward the rotor, and said first transition region having first transition webs extending from the stator yokes toward the rotor and sized to end beneath the central groove webs, when viewed in a direction toward the rotor, with the central groove webs and the first transition webs respectively forming grooves which, when viewed from the stator yoke, are open toward the rotor and, when viewed in the direction of movement of the rotor, are respectively delimited laterally by two central groove webs, or by two first transition webs, or by one of the central groove webs and an adjoining one of the first transition regions, each said stator segment having on a side facing away from the rotor in the second transition region a transverse web from which second transition webs extend toward the rotor and form grooves which, when viewed from the stator yoke, are open toward the rotor and, when viewed in the direction of movement of the rotor, are delimited laterally by two second transition webs, said second transition webs sized to end at a same height as the central groove webs, when viewed in the direction toward the rotor, wherein the stator yoke has a lower edge which, when viewed in the direction toward the rotor, has a yoke spacing from the rotor, wherein the first transition webs has a spacing from the rotor, when viewed in the direction toward the rotor, said spacing of the first transition webs from the rotor being sized at least as great as a spacing of a lower edge of the transverse web facing away from the rotor, wherein the first and second transition regions of adjoining stator segments, when viewed in the direction of movement of the rotor, overlap one another and are arranged one above the other, when viewed from the stator toward the rotor.

2. The electric machine of claim 1, wherein the stator segments are formed in one piece.

3. The electric machine of claim 1, wherein each of the stator segments includes a first stator segment part comprising the central region and the first transition region, and a second stator segment part comprising the second transition region, said first and second stator segment parts being connected to one another.

4. The electric machine of claim 3, wherein the first and second stator segment parts are connected to one another by a tongue-and-groove connection.

5. The electric machine of claim 1, wherein the stator includes first windings, each having two winding halves, and second windings, each having two winding halves, with one of the two winding halves of the first winding and one of the two winding halves of the second winding being arranged between two adjacent ones of the central groove webs, wherein the other one of the winding halves of the first winding is arranged between two central groove webs, or between one of the central groove webs and an adjoining one of the first transition regions, or between two adjoining ones of the first transition webs, wherein the other one of the winding halves of the second winding is arranged between two central groove webs, or between one of the central groove webs in adjoining relationship to one of the second transition regions, or between two adjoining ones of the second transition webs, wherein neither one of the two winding halves of the second winding is arranged between two first transition webs, and wherein neither one of the two winding halves of the first winding is arranged between two second transition webs.

6. The electric machine of claim 5, wherein the first windings are of same construction.

7. The electric machine of claim 5, wherein the second windings are of same construction.

8. The electric machine of claim 5, wherein the first and second windings are of same construction.

9. The electric machine of claim 1, wherein the stator segment is curved in circular fashion about an axis of rotation, wherein the direction of movement of the rotor runs tangentially with respect to the axis of rotation, and wherein a direction from the stator to the rotor runs radially with respect to the axis of rotation.

10. The electric machine of claim 1, constructed to operate as a generator in a wind turbine.

\* \* \* \* \*

UNITED STATES PATENT AND TRADEMARK OFFICE
CERTIFICATE OF CORRECTION

PATENT NO. : 9,450,458 B2  Page 1 of 1
APPLICATION NO. : 14/767950
DATED : September 20, 2016
INVENTOR(S) : Frank Brasas et al.

It is certified that error appears in the above-identified patent and that said Letters Patent is hereby corrected as shown below:

On the Title Page

Column one, Assignee (73): please correct the assignee's place of business to read:
--München-- instead of "Ingolstadt".

Signed and Sealed this
Tenth Day of January, 2017

Michelle K. Lee
*Director of the United States Patent and Trademark Office*